Figure 1:
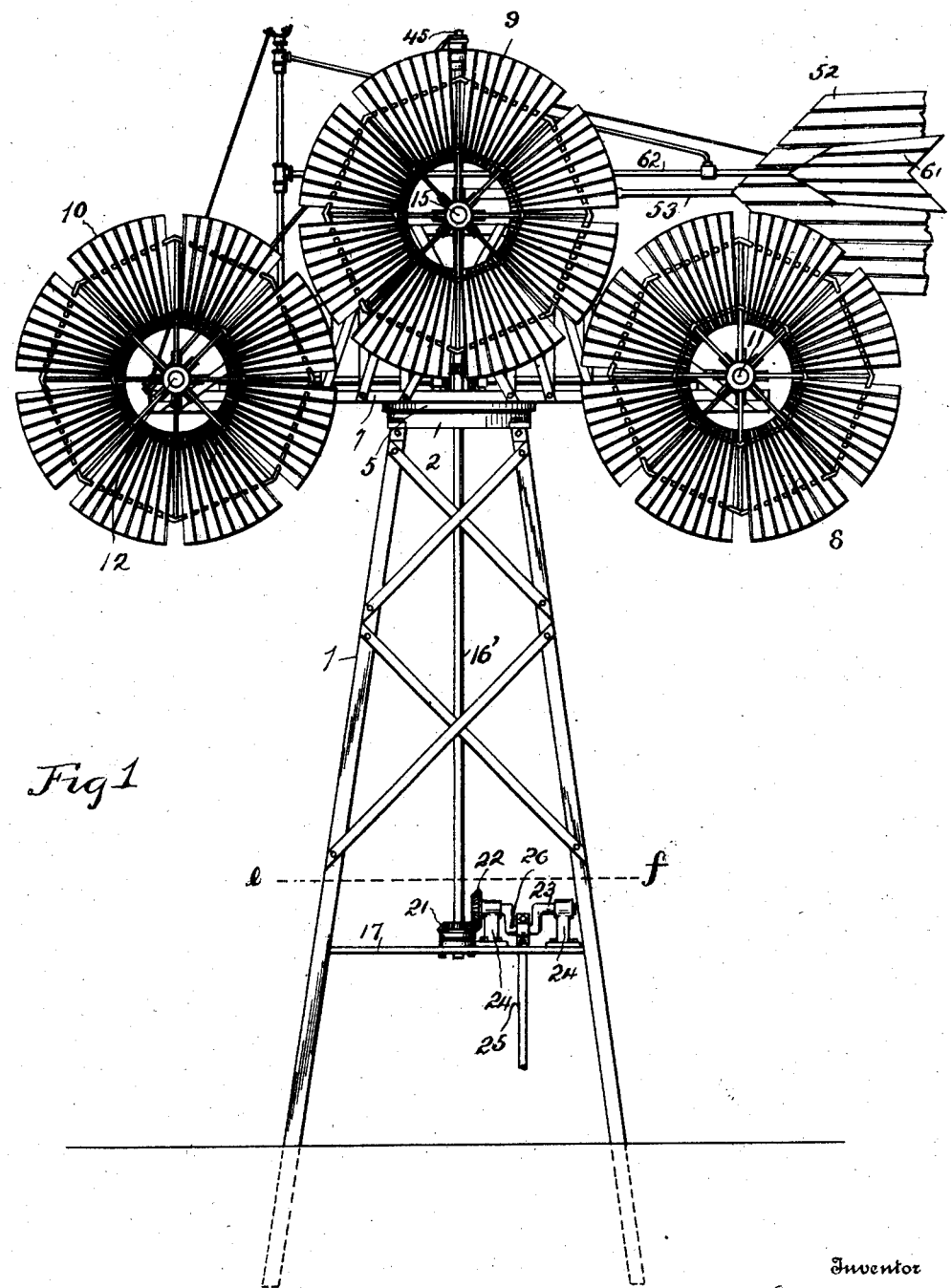

No. 879,162. PATENTED FEB. 18, 1908.
A. F. GEORGE.
WINDMILL.
APPLICATION FILED OCT. 28, 1905.

5 SHEETS—SHEET 1.

Witnesses:
R. E. Hamilton.
W. C. Singler.

Inventor
Albert F. George
By Warren D. House
His Attorney

THE NORRIS PETERS CO., WASHINGTON, D.C.

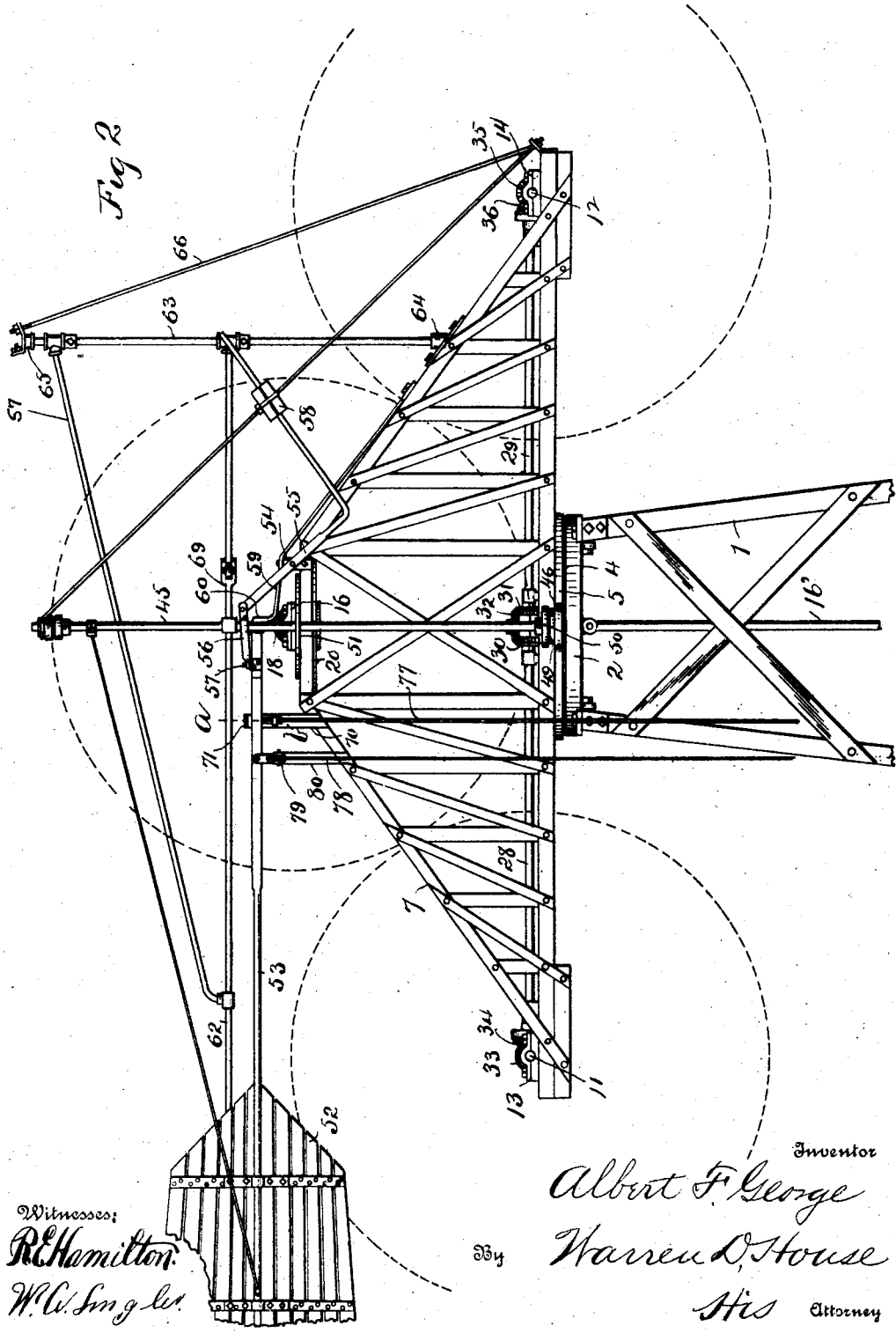

No. 879,162. PATENTED FEB. 18, 1908.
A. F. GEORGE.
WINDMILL.
APPLICATION FILED OCT. 28, 1905.
5 SHEETS—SHEET 3.
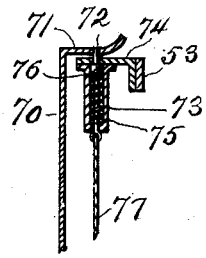
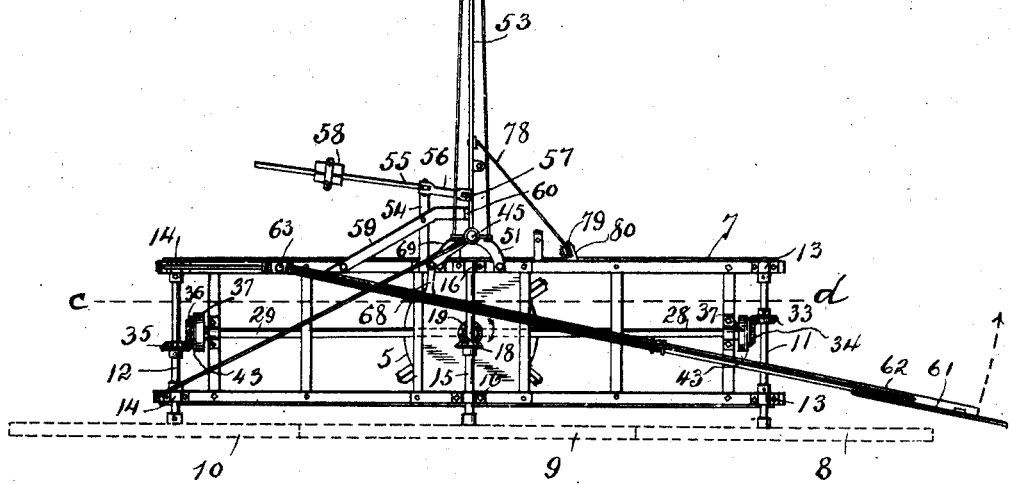

No. 879,162. PATENTED FEB. 18, 1908.
A. F. GEORGE.
WINDMILL.
APPLICATION FILED OCT. 28, 1905.
5 SHEETS—SHEET 4.
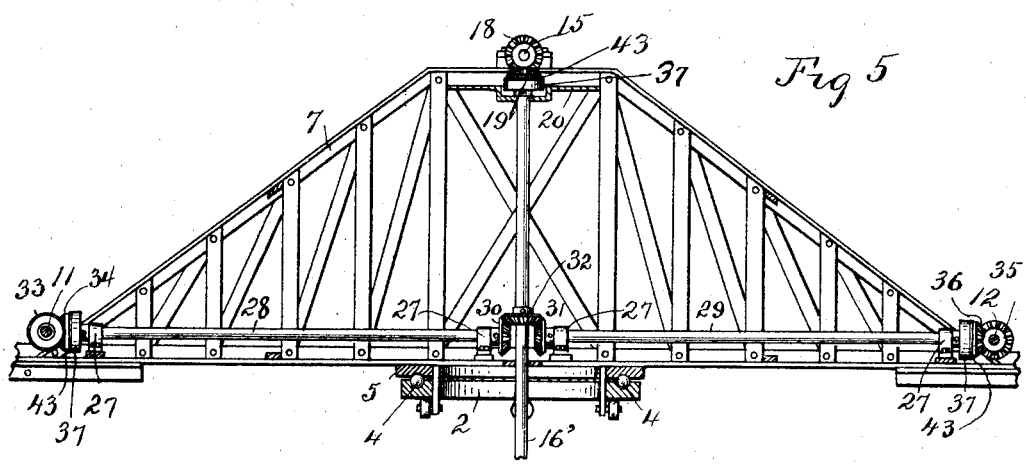
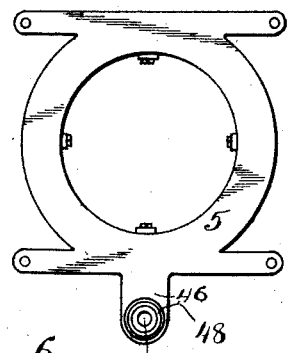
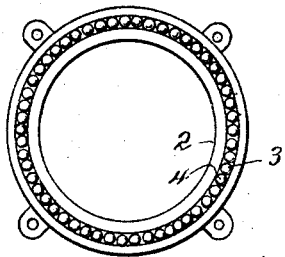
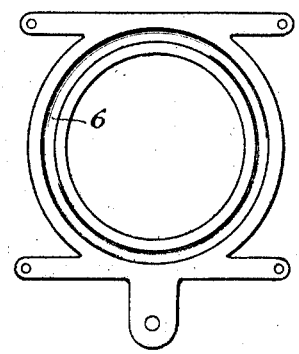
Witnesses
R. E. Hamilton.
W. C. Singles.
Inventor
Albert F. George
By Warren D. House
His Attorney No. 879,162.
PATENTED FEB. 18, 1908.
A. F. GEORGE.
WINDMILL.
APPLICATION FILED OCT. 28, 1905.
5 SHEETS—SHEET 5.
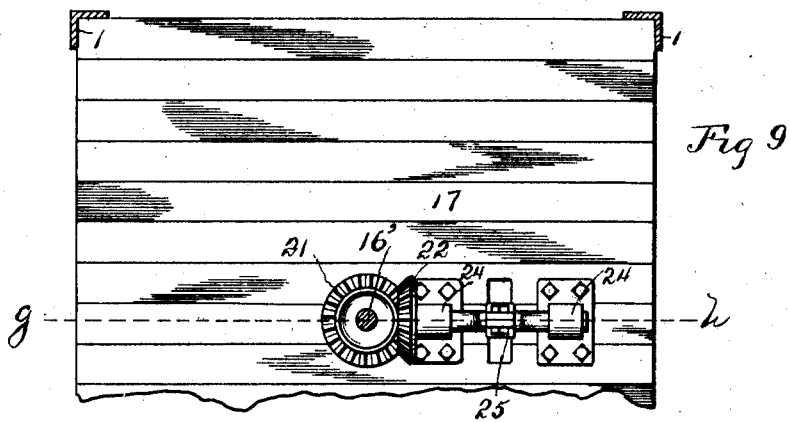
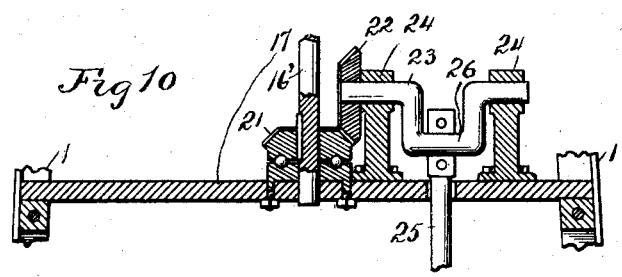
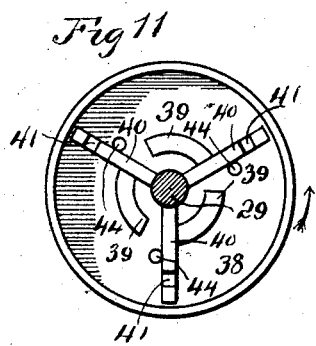
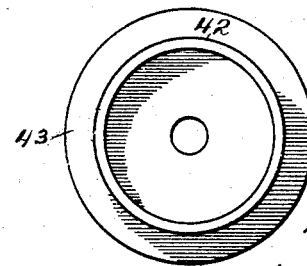
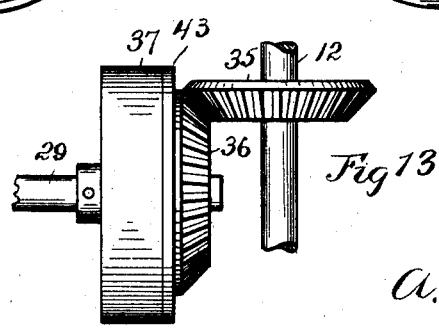
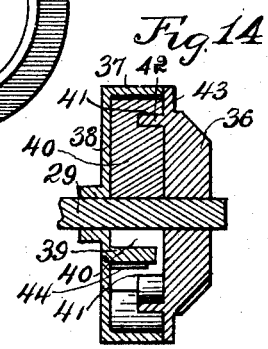
Witnesses:
R. E. Hamilton.
W. W. Singler.
Inventor
A. F. George
By Warren W. House,
His Attorney

UNITED STATES PATENT OFFICE.

ALBERT F. GEORGE, OF BISBEE, ARIZONA TERRITORY, ASSIGNOR TO THE GEORGE COMBINATION WINDMILL COMPANY, OF BISBEE, ARIZONA TERRITORY, A CORPORATION OF ARIZONA TERRITORY.

WINDMILL.

No. 879,162.  Specification of Letters Patent.  Patented Feb. 18, 1908.

Application filed October 28, 1905. Serial No. 284,780.

*To all whom it may concern:*

Be it known that I, ALBERT F. GEORGE, a citizen of the United States, residing at Bisbee, in the county of Cochise and Territory of Arizona, have invented new and useful Improvements in Windmills, of which the following is a specification.

My invention relates to improvements in windmills.

The object of my invention is to provide novel means by which a plurality of wind wheels mounted on a single tower may have the power derived from their rotation employed collectively for some useful purpose, such as rotating a driving shaft or reciprocating the pitman connected with and operating a pump.

My invention provides further a novel mechanism by which a plurality of windwheels mounted on a single tower and rotatable one independently of the other may jointly be employed for the production of power.

My invention provides further a truss or support of novel construction rotatively mounted on the tower and supporting the plurality of windwheels.

My invention provides further a vertically reciprocative member movable downward by gravity combined with a wind wheel and means by which the wind wheel will force the member upwardly but will permit said member to be moved downwardly by gravity, thus effecting a more rapid reciprocation of the member than can be accomplished with a member which is positively driven in both directions by the wind wheel.

My invention provides further a plurality of windwheels, a member vertically reciprocative, and means by which the power of the wind wheels may be collectively employed for the purpose of moving the member upwardly, said means providing for the downward movement of the member by gravity.

My invention provides further a novel governing mechanism by which the truss may be swung automatically so as to throw the windwheels in and out of the wind.

My invention provides in connection with the truss pivoted on the tower, two vanes, one for swinging the truss to positions in which the wind wheels carried by the truss will be thrown into or facing the wind, and means by which the other vane is utilized for swinging the truss to positions in which the wind wheels will be thrown out of the wind under certain pressures of wind.

My invention provides adjustable means by which the swinging of the truss by the auxiliary vane may be regulated to occur at different wind pressures.

Other novel features are hereinafter fully described and claimed.

In the accompanying drawings illustrating my invention, Figure 1 is a front elevation view showing the vanes disposed parallel with each other and the wind wheels thrown out of the wind, a portion of the main vane being broken away. Fig. 2 is a rear elevation view, the windwheels being removed and their positions denoted by dotted lines. Fig. 3 is a top view, the wind wheels being denoted by dotted lines and the truss disposed with the vanes at an angle to each other. Fig. 4 is a vertical section of the main vane locking device taken on the dotted line *a—b* of Fig. 2. Fig. 5 is a vertical sectional view of the truss and parts connected therewith, taken on the dotted line *c—d* of Fig. 3. Fig. 6 is a top view of the upper member provided with the ball race and secured to the truss. Fig. 7 is a top view of the lower member having the ball race and secured to the top of the tower. Fig. 8 is an under view of the member shown in Fig. 6. Fig. 9 is a horizontal sectional view taken on the dotted line *e—f* of Fig. 1, a portion of the tower and platform being removed. Fig. 10 is a vertical section taken on the dotted line *g—h* of Fig. 9. Fig. 11 is an inside elevation view of one of the members of one of the clutches. Fig. 12 is an inside elevation view of the other member of one of the clutches. Fig. 13 is a top view of one of the clutches and parts connected thereto; and Fig. 14 is a horizontal sectional view of the same.

Similar characters of reference denote similar parts.

1 denotes the ordinary tower having secured to its upper end a horizontal annular plate 2 provided in its upper side with a circular ball race 3 having mounted therein a series of balls 4 upon which is mounted a horizontal annular plate 5 having a circular race 6 in its under side in which are located the balls 4.

Centrally secured to the upper side of the member 5 is a support or truss 7, constructed in any suitable manner, but preferably made of strips of steel joined together in the manner of an ordinary bridge truss. The truss 7 supports, in the manner hereinafter described, three wind wheels 8, 9 and 10, constructed in the manner of ordinary vertical wind wheels. The wheels 8 and 10 are centrally secured to the outer ends respectively, of two horizontal, transverse shafts 11 and 12 rotatively mounted at their ends respectively, in boxes 13 and 14 respectively, mounted upon the respective ends of the truss 7. The wheel 9 is disposed between and above the wheels 8 and 10 and is secured upon the outer end of a horizontal transverse shaft 15, rotatively mounted in suitable bearings 16, secured upon the upper end and in the center of the truss 7.

16' denotes a vertical shaft the lower end of which is rotatively mounted upon a horizontal platform 17, secured above the ground near the lower end of the tower 1.

As shown in Fig. 3, the shaft 15 has rigidly secured to it a beveled gear wheel 18, which meshes with a bevel gear wheel 19, rotatively mounted upon the upper end of the shaft 16', which shaft has its upper end rotatively mounted in a horizontal transverse plate 20, secured to the upper side of the truss 7.

As shown best in Figs. 1, 9 and 10, the shaft 16' has rigidly secured to it a bevel gear wheel 21, which meshes with the bevel gear wheel 22, rigidly secured upon a crank shaft 23 rotatively mounted in bearings 24 supported upon the platform 17. A downwardly extending pitman 25 has its upper end pivotally secured to the crank 26 of the crank shaft 23.

By means of the following described mechanism the wind wheels 8, 9 and 10 may rotate independently, one from the other, and have their power collectively applied for the rotation of the shaft 16'. Upon the truss 7, in bearings 27, are rotatively mounted two horizontal, longitudinal shafts 28 and 29, disposed in alinement with each other, upon opposite sides respectively of the vertical shaft 16'. Upon the inner ends of the shafts 28 and 29 respectively, are secured two bevel gear wheels 30 and 31, which mesh respectively with a bevel gear wheel 32, secured upon the shaft 16'. Upon the shaft 11 is secured a bevel gear wheel 33, which meshes with a bevel gear wheel 34, rotatively mounted upon the outer end of the shaft 28. Upon the shaft 12 is secured a bevel gear wheel 35, which meshes with a bevel gear wheel 36, rotatively mounted upon the outer end of the shaft 29. Three friction clutches connect the bevel gear wheels 19, 34 and 36 with the shafts 16', 28 and 29 respectively. The three said clutches are identical in construction, the construction of the one connected with the gear wheel 36 being shown in Figs. 11, 12, 13 and 14. Referring to the said figures, 37 denotes one of the clutch members comprising a disk having an outwardly extending flange, said disk being denoted by the numerals 38. Said disk is secured centrally and rigidly to the shaft 29. On the outer side of the disk 38, arranged in a circle, are three projections 39. Between the said projections are disposed respectively three radial bars 40 each provided on its outer edge with a transverse slot 41 adapted to receive therein an annular flange 42, disposed concentrically upon the inner side of the outer clutch member 43. Said clutch member is rotatively mounted upon the outer end of the shaft 29 and has rigidly secured to it the bevel gear 36. On the outer side of each disk 38, disposed respectively in radial lines located midway between the projections 39, and disposed in a circle concentric with but outside of the circle in which lie the projections 39, are three stop pins or projections 44. The spaces between the projections 39 are wide enough to permit the disposal therein of the bars 40 at either side of the pins 44 respectively; the disposal of said bars upon one side or the other of the pins 44 depending upon the direction in which the clutch is to rotate. When the bars 40 are disposed as shown in Fig. 11, the flange 42 of the member 43 will be positioned so as to rotate freely in the grooves 41.

The grooves or slots 41 in the bars 40 are of a width such that when the bars 40 are in the positions shown in Fig. 11 the flange 42 will barely clear. Rotation of the flange 42 in the direction denoted by the arrow in Fig. 11 will move the bars 40 away from the position shown and away from the pins 44, and will cause the bars 40 to cramp on and clamp the flange 42, and thus, by bearing against the lugs 39, impart rotation to the member 37. If for any reason the member 37 should rotate more rapidly than the member 43 the pins 44 will be carried against the adjacent bars 40 and will force them to the position shown in Fig. 11, in which position, as stated before, the bars 40 will slide freely around the flange 42, thus permitting the shaft 29 and member 37 to rotate faster than the member 43 and shaft 12. On the upper end of the shaft 16' is mounted a clutch similar to the one just described, the member 37 being secured rigidly to the said shaft and the member 43 secured to the gear wheel 19. On the outer end of the shaft 28 is secured another friction clutch similar to the one hereinbefore described the member 37 being secured rigidly to the shaft 28 and the member 43 secured to the inner side of the gear wheel 34.

The disposition of the bars 40 in the clutches mounted upon the shafts 29, 16', and 28, and the disposition of the gear wheels 18, 19, 30, 31, 32, 33, 34, 35 and 36, are such that the wind wheels 8, 9 and 10 in rotating will all operate to drive the shaft 16' in one direction, which direction is indicated by an arrow in Fig. 3. The shaft 16' in rotating will rotate the shaft 23 through the intermediacy of the gears 21 and 22 so as to raise the pitman 25. When the pitman 25 has been raised to the upper position the weight carried by the said pitman, such as its own weight, and the weight of the pump piston and piston rod, not shown, will, in cases where the pitman performs no work on the down stroke, cause the pitman to move downwardly at a speed greater than it would be moved by the rotation of the wind wheels. The greater speed of movement of the pitman downward is possible by reason of the employment of the friction clutches for driving the shafts 28, 29 and 16', said clutches, for the reasons already given, permitting the flanges 42 to slip through the grooves 41 of the bars 40 when the members 37 rotate more rapidly but in the same direction as the members 43. It will thus be seen that in a given length of time the pitman 25 will be reciprocated a greater number of times than would be the case were the pitman driven positively in both directions by the wind wheels. As soon as the pitman reaches the limit of its downward stroke it will, owing to the weight carried by it, through the intermediacy of the shaft 23 and gears 21 and 22, exert a retarding effect upon the rotation of the shaft 16', which retarding effect will be immediately communicated to the three clutches causing the members 37 and 43 of said clutches to again become locked together, whereby the wind wheels will again effect the upward movement of the pitman 25 in the manner already described. A further advantage in the use of the friction clutches is to permit the independent rotation of the wind wheels. Thus, if one wind wheel should, by reason of less wind pressure lag behind the other wind wheels, it will not, by reason of its lagging, throw an additional load upon the other wheels, but the clutch through which it conveys its driving power to the shaft 16' will permit its slower rate of rotation.

I will now describe the mechanism by which the wind wheels are thrown into or out of the wind:—To the rear of the truss 7 is a vertical oscillatory shaft 45, the lower end of which is pivotally mounted on the plate 5 in the following manner:—The rear edge of said plate is provided with a horizontal projection 46 provided with a vertical hole 47, in which is inserted the lower end of the shaft 45. In the upper side of the projection 46 concentric with the hole 47, is a ball race 48 in which are mounted a series of balls 49, upon which rests a horizontal disk 50, centrally rigidly secured to the shaft 45. Said shaft 45 is also pivotally mounted in a horizontal bracket 51, secured to the central upper portion and rear side of the truss 7. The main vane comprises a vertically disposed blade 52, secured to the outer end of a horizontal bar 53, the inner end of which is rigidly secured above the bracket 51 to the shaft 45. Pivoted at one side of the shaft 45 to the vertical portion of an L-shaped bracket 54, secured at the inner end of its horizontal portion to the upper part of the truss 7, is a bell crank lever 55, one end of which is pivotally connected to one end of a link 56, the other end of which is pivotally connected so as to swing vertically to an upwardly extending pin 57, secured to the bar 53. The other arm of the bell crank lever has a longitudinally adjustable weight 58 mounted thereon. A bar 59, secured to the upper side of the bracket 54 and to the truss 7 and has an upwardly turned portion 60 so disposed as to be struck by the bar 53 and normally retain said bar at right angles to the truss and to the faces of the wind wheels 8, 9 and 10. The weight 58 is so disposed as to swing the lever 55 in a direction such as will bring the bar 53 against the stop 60, said weight 58 serving as a yielding means for retaining the main vane positioned at right angles to the truss.

For swinging the truss so as to throw the wind wheels out of the wind the following mechanism is employed: An auxiliary vane comprising a vertical blade 61, secured to the outer end of a horizontal bar 62, is pivotally mounted on the truss 7 by means of a vertical shaft 63, to which one end of the bar 62 is pivotally secured, said shaft 63 having its lower end mounted in a shoe 64, secured upon the upper side of the truss. The upper end of the shaft 63 is mounted in a bearing 65, held in place by the rod 66, connected to the truss. An inclined supporting rod 67 is secured at its lower end to the bar 62 and at its upper end is pivotally secured to the shaft 63 at a point above the bar 62. A link 68 best shown in Fig. 3, is pivotally connected at one end to the bar 62 and at the other end to a laterally extending crank arm 69, provided on the shaft 45.

The auxiliary vane has its blade 61 disposed normally at an angle to the blade 52 of the main vane. When the parts are as shown in Fig. 3, with the wind wheels facing the wind, the blade 61 is disposed flatwise toward the wind. When the wind pressure is sufficiently strong it will swing the blade 61 rearwardly, thus swinging the truss 7 through the intermediacy of the link 68, crank arm 69, and shaft 45, the main vane, by reason of its greater size, being held substantially parallel with the direction of the movement of the wind. The weight 58 will resist the swinging of the truss, but when the wind pressure is sufficiently strong this resistance will be overcome and the truss will swing to a position, shown in Figs. 1 and 2, in which the vanes will be disposed substantially parallel with one another, in which position the wind wheels will be thrown out of the wind. To releasably lock the vanes in this position, the following mechanism, best shown in Figs. 2 and 4, is employed:—
To the rear side of the truss 7 is secured the lower end of a vertical bar 70, the upper end of which is provided with a horizontal portion 71 having an upwardly turned outer end and provided with a vertical hole adapted to receive therein the upper end of a bolt 72, vertically movable in a cylinder 73, the upper end of which is secured to the lower side of the horizontal portion of a bracket 74, the vertical portion of which is secured rigidly to the bar 53. The lower end of the cylinder 73 is closed and supports the lower end of a coil spring 75 the upper end of which bears upon the lower side of an enlarged portion 76 of the bolt 72. The bolt 72 extends through a hole provided for it in the bottom of the cylinder 73 and has secured to it the upper end of a rope 77 by which the bolt 72 may be withdrawn from the hole in the horizontal portion 71 of the plate 70. When the vanes are swung to the position shown in Fig. 2, the horizontal portion 71 of the plate 70 will depress the bolt 72 until the bolt registers with the hole in the horizontal portion 71, at which time the spring 75 will cause the bolt 72 to enter the hole in the portion 71, thus locking the parts in the position shown in Fig. 2.

In order that the truss may be thrown out of the wind by hand a cord 78 has one end secured to the bar 53, said cord passing from thence over a pulley 79 rotatively mounted in the upper end of a vertical post 80, the lower end of which is secured to the rear side of the truss 7. By drawing downward on the cord 78 the truss may be swung to the position shown in Fig. 2.

Having thus described my invention, what I claim and desire to secure by Letters Patent, is:—

1. The combination with the tower, of a truss pivoted to swing horizontally thereon, a vertical oscillatory shaft mounted on the truss and having a crank arm, a main vane secured to and oscillatable with the said shaft, a stop for limiting the oscillation of the vane relative to the truss in one direction, yielding means for normally forcing the truss to a position in which the vane will rest against said stop, an auxiliary vane pivoted to said truss and disposed at an angle to the main vane when the main vane is against said stop, and a link pivoted to the auxiliary vane and to said crank arm by which, under sufficient wind pressure, the auxiliary vane will swing the truss relative to the main vane in a direction opposite the direction in which the truss is forced by said yielding means.

2. The combination with the tower, of a truss pivoted to swing horizontally thereon, a vertical shaft pivoted to said truss and having a crank arm, a main vane secured to and movable with said shaft, a lever pivotally mounted on said truss, a weight for moving said lever in one direction, means for swinging said truss relative to said vane when the lever is moved by the weight, an auxiliary vane pivoted to the truss and disposed normally at an angle to the main vane, and a link pivoted to the auxiliary vane and to said crank arm by which, under sufficient wind pressure, the truss is swung relative to the main vane in a direction opposite that in which the truss is swung by the weight.

3. The combination with the tower, of a truss pivoted to swing horizontally thereon, a vertical shaft pivoted to the truss and having a crank arm, a main vane secured to and movable with the shaft, a lever pivoted to the truss, a weight for forcing said lever in one direction, a link connecting said lever and said vane, an auxiliary vane pivotally mounted on said truss and disposed normally at an angle to the main vane, and a link pivoted to the auxiliary vane and to said crank arm for swinging said vertical shaft in a direction opposite that in which it is swung by said weight when the auxiliary vane is swung under sufficient wind pressure.

4. The combination with the tower, of a truss pivoted to swing horizontally thereon, a vertical shaft pivoted to the truss and provided with a crank arm, a main vane secured to and movable with said shaft, an auxiliary vane pivoted to said truss and disposed normally at an angle to the main vane, a link pivoted to said auxiliary vane, and to said crank arm, a lever pivotally mounted on the truss, means for swinging said lever in a certain direction, and means by which, when said lever is swung in said direction, the truss will be swung relative to the main vane.

5. The combination with the tower, of a truss pivoted to swing horizontally thereon, a vertical shaft pivoted to the truss and having a crank arm, a main vane secured to said shaft, an auxiliary vane pivoted to the truss, a link pivotally connected with said crank arm and to the auxiliary vane, a lever pivoted to the truss, a link connecting the main vane and said lever, and a weight adjustable lengthwise of said lever and forcing said lever to swing in a direction such that the truss will be swung relative to the main vane away from a position in which the vanes will be parallel with each other.

In testimony whereof I affix my signature, in presence of two subscribing witnesses.

ALBERT F. GEORGE.

Witnesses:
 WARREN D. HOUSE,
 HENRY F. ROSE.